United States Patent Office

Re. 26,719
Reissued Nov. 18, 1969

26,719

PRINT-OUT PROCESS AND IMAGE REPRODUCTION SHEET THEREFOR

David P. Sorensen and Joseph W. Shepard, St. Paul, Minn., assignors to Minnesota Mining and Manufacturing Company, St. Paul, Minn., a corporation of Delaware No Drawing. Original No. 3,152,904, dated Oct. 13, 1964, Ser. No. 379,016, June 29, 1964. Application for reissue Oct. 10, 1966, Ser. No. 589,178
Int. Cl. G03c *5/26, 1/48*
U.S. Cl. 96—63 22 Claims

Matter enclosed in heavy brackets [ ] appears in the original patent but forms no part of this reissue specification; matter printed in italics indicates the additions made by reissue.

*ABSTRACT OF THE DISCLOSURE*

*The invention pertains to image reproduction sheets in which radiation-sensitive heavy metal salts may be reduced to free metal and form the image components in an oxidation reduction reaction combination by producing a visible color change with an organic silver salt.*

The present invention relates to a novel and useful reproduction system. In one aspect the invention relates to the permanent reproduction of images or patterns on a surface by irradiation. In another aspect, the invention relates to a new reproduction surface or sheet material. In still another aspect the invention relates to a new and novel photographic process in which an image is reproduced directly without the conventional chemical developing step. This application is a continuation-in-part of our co-pending application S.N. 860,661, filed December 21, 1959, now abandoned.

Numerous processes are known for the reproduction of light images and for copying graphic material. One of the more common and typical of such processes is that known as the silver halide process. This process requires exposure of a sensitive film or paper to the light or image source followed by development of the image with a separate chemical solution and subsequent fixation of the developed image. Another typical process is known as electrophotography, and this process depends upon the presence of a photoconductive material in the master or in the copy paper.

The silver halide process and similar processes are considered capable of more sensitivity than the electrophotographic process. A disadvantage of the silver halide process, however, is the rather involved wet developing procedure using various chemical solutions. On the other hand, the disadvantages of the electrophotographic process is the lower sensitivity thereof. Most of these processes require a separate step in addition to the developing step in order to fix the image so that upon exposure to normal light conditions the image will not fade or the background will not darken. It is much to be desired, therefore, to provide a simpler process than the above with elimination of their disadvantages.

An object of this invention is to provide a novel light-sensitive composition.

Another object of this invention is to provide a process for the photographic reproduction of images or copying of printed matter and the like.

Still another object of this invention is to provide a more sensitive dry process for reproduction of images, printed matter and the like.

Still another object of this invention is to provide a reproduction process that does not require chemical solutions for either a developing step or a fixing step.

Yet another object of this invention is to provide a novel photosensitive copy paper or film which does not require fixing of the reproduced image.

Another object is to provide a new photographic transparency film.

Another object of this invention is to provide a radiation-sensitive composition and a process for development so that after exposure it can be developed and fixed in a single operation.

Various other objects and advantages will become apparent to those skilled in the art from the accompanying description and disclosure.

According to this invention, the reproduction system comprises an image-forming composition or combination and a relatively minor amount of a separate radiation-sensitive metal compound capable of deposition or formation of free metal upon irradiation that is in contact with said image-forming composition and is chemically different from the components of the image-forming composition. The radiation-sensitive reproduction system is usually in a dry condition and is supported by or part of a suitable inert carrier or sheet to form a copy paper or film. The carrier sheet containing the radiation-sensitive reproduction system is exposed to an image source or radiation source and the image or pattern to be copied is reproduced initially as a latent image by formation of free metal nuclei from the radiation-sensitive metal compound, which free metal nuclei catalyzes or initiates the image-forming composition upon development to visibly reproduce the image or pattern. The free metal nuclei is formed in a pattern corresponding to the image or radiation source.

The image-forming composition of the system is a relatively non-radiation sensitive or light stable, irreversible oxidation-reduction reaction composition which is capable of being initiated or catalyzed into reaction by the free metal nuclei initially formed by exposure to radiation. The oxidation-reduction reaction composition comprises two solid phases, a separate solid oxidizing agent and a separate solid reducing agent which can react with each other to visibly reproduce the image. Any such oxidation-reduction reaction composition having a negative-free energy under the exposure conditions and having at least one component thereof which can react to produce a change in light value (change in color) suffices as the image-forming composition. The image-forming composition is dry and its reaction is catalyzed by the free metal and may be self-initiated, or initiated by water or heat.

In addition to the image-forming composition above described, the radiation-sensitive reproduction system requires a separate relatively radiation-sensitive or photosensitive metal compound in contact or in catalytic proximity therewith, comprising a metal salt which can be reduced to free metal by exposure to radiation having a wave length below 5 microns, preferably below 1 micron, such as actinic light, X-rays or gamma rays, and is non-reactive with the image-forming composition in the dark.

The radiation-sensitive reproduction system of this invention may comprise an admixture of the above components described or may comprise layers of the components in any order. Preferably, the image-forming composition is applied as an admixture or dispersion with the radiation-sensitive metal salt to a suitable carrier sheet in a manner to uniformly distribute the admixture or dispersion laterally over one surface of the sheet. Any one or all of the components of the image reproduction system may comprise, or be impregnated in, the carrier. The irreversible reaction between the oxidizing agent and the reducing agent of the image-forming composition is catalyzed or initiated upon development by the free metal formed from the radiation-sensitive metal salt upon irradiation. A separate step is usually required to carry out the reaction and develop a visible image, such as by heating or by aqueous wetting or by wetting with an ionizable organic solvent, such as methanol or ethanol, the exposed composition.

Inactivation or fixing of the image reproduction system is usually not required, but in some instances an inactivation or fixing operation is desirable. Inactivation may be carried out by inactivating the image-forming composition, for example, by complexing or forming an inert salt of one or more of the reactants.

As previously stated, the solid image-forming composition includes both an oxidating agent and a reducing agent. The oxidizing agent in this composition must be relatively non-light sensitive (light stable as compared to the radiation-sensitive compound) and is usually the image former but not necessarily. The preferred oxidizing agents are the organic silver salts, such as silver saccharin, silver 5-chlorosalicylaldoxime, silver 5-nitrosalicylaldoxime, and the water insoluble silver salts of long chain fatty acids such as silver behenate and silver stearate.

The solid reducing agent of the image-forming composition to be used as an independent agent from the oxidizing agent includes relatively light stable organic compounds, such as the substituted pyrazolidones, the substituted and non-substituted hydroxylamines, aminophenols, the dihydric phenols, aromatic esters and aromatic diamines. Examples of substituted hydroxylamines include phenyl hydroxylamine and benzyl hydroxylamine. An example of an aminophenol is Metol or Elon (N-methyl paraminophenol sulfate). Suitable dihydric phenols include hydroquinone and catechol. Methyl gallate is an example of a suitable ester and phenylene diamine as a suitable diamine.

In some instances, the non-light sensitive oxidizing agent works best in basic media. The basic media may be provided in the image-forming composition by the inclusion therein of an organic or inorganic base, such as ammonium hydroxide or sodium acetate, or any salt of a strong base and weak acid, such as sodium or potassium carbonate.

The selection of the particular oxidizing agent to be used with a particular reducing agent is, of course, determined by the ability of either one or both of the compounds in their reacted form to show a change in light value, such as a change in color, or to react with another compound resulting in a light value change. The oxidation-reduction potential ($E_0$) for the reaction between the oxidizing agent (electron acceptor) and the reducing agent (electron donor) must be positive under the conditions of reaction. This can be calculated from the standard electrode potential ($E_0$) for the half cells. Preferably, the oxidization-reduction potential ($E_0$) for the reaction is not lower than about +0.6 volt.

As previously stated, the radiation-sensitive metal salt is a separate solid which may be combined or admixed with the ingredients in the image-forming composition or may form a separate layer or be impregnated in the carrier. The radiation-sensitive material is a heavy metal salt, preferably a Group 1*b* metal of the Periodic Table, which has not been previously exposed to light and which will be reduced to free or elementary metal when activated by radiation wave lengths below 5 microns. The salt may be organic or inorganic and is preferably a metal diazosulfonate salt, a salt of hydrogen halide, such as chloride, bromide or iodide, or a salt of nitric or sulfinic acid. Suitable metals include silver, copper, chromium, cobalt, platinum and gold; silver being preferred. Mixtures of the above can be used, if desired.

A simple test may be used to determine whether or not a particular metal salt can photogenerate a catalyst (free metal) for the reaction of the silver oxidizing agent with the reducing agent. A freshly prepared sample of the metal salt in question (50 mg.) is intimately admixed with an aqueous or alcoholic suspension or dispersion (5 ml.) of silver saccharin or silver behenate (0.5 g.). This dispersion is coated on filter paper and dried. The coated paper is then overcoated with aqueous or alcoholic solution of a 0.5% aqueous or alcohol solution (5 ml.) of a reducing agent, preferably hydroquinone and again dried. No immediate reaction should take place in the absence of light. This coated filter paper is then exposed to light (about 5–10 seconds, RS sun lamps—6 inches' distance) and heated to about 90–100° C. for 5 seconds. If the exposed paper darkens more rapidly than a similar paper sample under the same conditions without the metal salt, the salt is suitable as a light-sensitive generator of a catalyst.

The irradiation source is an important feature of the present invention. Ultraviolet light is one of the best radiation sources, and all of the light-sensitive metal salts are sensitive thereto. An incandescent filament is a fair source of ultraviolet light. Fluorescent light is a better source of ultraviolet light. The light-sensitive metal salts are not usually sensitive to the entire spectral light range but may be made so by the use of dye sensitizer, such as eosin, uranine, and erythrosin. Irridation by X-rays or gamma rays is also effective in reducing the metal salt to deposit free metal.

The binding agent used to bind the image-forming composition and the radiation-sensitive salt to the carrier medium is also an important feature of the present invention. In general, these binders should be translucent or transparent so as not to interfere with the transmission of light therethrough. The preferred binders are the organic materials, such as solid polymers and resins. Suitable organic resins and polymers include a copolymer of butadiene and styrene sold on the open market as Pliolite, polyethyleneglycol, polyamide sold as Zytel–61, polyisobutylene, polyvinylchloride, and polyvinylpyrrolidone. Other binders include polystyrene, chlorinated rubber, rubber hydrochloride, polyvinylchloride, nitrocellulose, and polyvinylbutyral. Some of these binders are water soluble, such as polyethyleneglycol and polyvinylbutyral, and this fact should be taken into consideration in their use.

The carrier material or support upon which the radiation-sensitive metal salt and image-forming composition are deposited may be any suitable inert backing or substrate of sufficient strength and durability to satisfactorily serve as a print or reproduction. The carrier may be in the form of sheets, ribbon, roll or other suitable form for supporting the reproduction of the image. The carrier or backing may comprise wood pulp paper, rag content paper, various synthetic plastics such as cellulose acetate and polyethylene terephthalate (Mylar) in the form of film, cotton or wool cloth, metal foil or glass plate. The preferred form of the backing or carrier is a thin sheet which is flexible and durable.

An example of a suitable copy sheet containing the radiation-sensitive reproduction system of this invention comprises white wood pulp paper sheet coated with 0.01 weight percent silver benzenesulfinate as the radiation-sensitive salt with 99.9 weight percent of equal proportions of silver saccharin as the oxidizing agent and image-forming material, and Metol or Elon (N-methyl paraminophenol sulfate) as the reducing agent. A dispersion or slurry is formed of these materials including a suitable binder and organic diluent in the dark and is then immediately coated uniformly on a wood pulp type paper (5 to 20 pound paper) in a thickness of about 4 mils (wet) and dried. The above copy sheet is prepared and maintained in the dark until used. Another method of construction is to apply an organic dispersion of silver benzenesulfinate to the paper first in about a 2-mil thickness (wet) with a suitable binder and drying followed by applying a top layer of the image-forming composition comprising the oxidizing agent and reducing agent also in a suitable binder from a separate organic dispersion and drying. The top layer should be sufficiently thin when dried to permit light penetration of this surface to the lower surface containing the photosensitive metal salt.

A negative film or transparency (developed) as a master is applied to the photosensitive surface of the copy sheet. The copy sheet is then exposed to actinic light (500 lumens) for about 1 to 15 seconds. The copy sheet and film are then removed from the presence of the actinic light, and the film separated from the copy sheet. The copy sheet contains a latent image ($Ag^0$) corresponding to the negative (latent or invisible because of the relatively small amount of light-sensitive silver salt used). The copy sheet is then developed by heating to 100 to 110° C. for about 5 to 10 seconds in the dark to produce a visible reproduction. When silver benzenesulfinate is omitted from the above process, no visible image or only a vague image is formed after the development step.

Mixtures of the various components of the system may be used as well as a single component. Thus, mixtures of two or more photosensitive metal salts may be used. Also, mixtures of two or more relatively light stable oxidizing agents or two or more relatively light stable reducing agents may be used without departing from the scope of this invention. Even mixtures of binders may be used.

The oxidizing agent and reducing agent are usually used in substantially stoichiometric proportions. If desired, an excess of either the oxidizing agent or reducing agent may be used without departing from the scope of this invention. The weight ratio of the radiation-sensitive metal salt to image-forming composition; i.e., the combination of oxidizing agent and reducing agent, is between about 50 and about 1,000 parts per million; preferably, between about 100 and about 250 parts per million. The binder is used in a sufficient amount to effectively bind the various ingredients to the carrier surface. Generally, the weight ratio of binder to the material to be bound is between about 2:1 to about 1:5.

The thickness of the image-reproducing system on the carrier will vary between about 0.5 and about 8 mils but may be as thin as 0.1 mil. In case separate layers for the image-forming composition and the radiation-sensitive metal salt are used on the carrier base, the total thickness will be within the above range and the thickness of each layer will be about 0.5 mil to about 4 mils. The thickness of the carrier base when in the form of a flexible sheet is usually between about 5 and about 30 mils.

The image-forming composition of this invention is normally latent under ambient and normal conditions. In other words, there is no observable reaction or visible image formed upon exposure, when such exposure is carried out at temperatures below about 50° C. under atmospheric conditions of humidity and pressure in the absence of the photosensitive metal salt. The image-forming composition may in the strict sense be considered to be radiation-sensitive but it has a slow response to radiation and as compared to the radiation-sensitive metal compound is considered relatively non-radiation sensitive or light stable. The presence of the radiation-sensitive metal salt greatly increases the speed of response of the image-forming composition for given conditions of exposure. For example, the density of the developed light struck areas increase several fold over that obtained without the use of the light sensitive metal salt for a given set of exposure and development conditions. The light-sensitive metal salt is reduced when irradiated with wave lengths of less than about 1 micron. Upon reaction, either the reducing agent or the oxidizing agent changes in light value so as to visibly reproduce the image. Normally, it is the oxidizing agent that reproduces the image. For example, a dark material may turn light upon reaction or a light material may turn dark. Also, a white material or colorless material may turn a color upon reaction or vice versa. Any change in the reflection or transmission of light as a result of the reaction between the reducing agent and the oxidizing agent constitutes a change in light value or color which causes a visible reproduction of the image, which reaction is usually effected in a developing step after exposure.

The exposure time will vary to a considerable extent and will depend primarily upon the type and intensity of light or irradiation source, the conditions of development, the particular oxidation-reduction composition, and upon the sensitivity of and particular radiation-sensitive metal salt used. In general, the time of exposure will vary between about 0.001 of a second and about 10 minutes. Generally, the reproduction requires not more than about 15 seconds exposure. The development of the exposed photosensitive sheet of this invention is carried out usually by heating the exposed sheet above 50° C., preferably between about 65 and about 110° C., for 1 to 20 seconds or by washing the exposed surface with water or an ionizable organic solvent.

Preferred image-forming compositions (oxidizing agent and reducing agent) comprise: silver saccharin and hydroquinone, and silver saccharin and Metol or Elon, silver saccharin and 1-phenyl-3-pyrazolidone, silver saccharin and sodium formate or oxalate, and silver behenate and hydroquinone.

A method of inactivation of the image reproduction system which may sometimes be desirable constitutes the chelation of the reducible metal ion by forming a very stable metal chelate with any of the unreacted metal ions of the oxidizing agent. The chelating compound is applied to the surface following developing. A chelating agent is benzotriazole which may be used with the silver ion of the oxidizing agent. Heating such a system to a temperature of about 65 to 110° C. produces a black image on a stable white background which is no longer developable.

A simple test for determining whether the metal chelate is no-light sensitive is to expose the metal chelate to ultraviolet light such as a commercial sun lamp. If the material does not darken after five minutes exposure, the chelating agent is suitable as a means for inactivating the photosensitive copy sheet.

An embodiment of this invention is to separately bind the radiation-sensitive metal salt and the image-forming composition on separate independent sheets. The sheets are then firmly pressed together and exposed to light. Thereafter, the sheets are separated and the image is formed on either the radiation-sensitive metal salt carrier or the image-forming carrier, depending upon the type of image-forming composition used. One method is to coat one sheet with a pressure-sensitive adhesive containing the image-forming composition, and the other sheet is coated with the light-sensitive metal salt and a conventional binder. The sheets are pressed together and form a sufficient bond such that the photosensitive metal salt is in catalytic proximity to the oxidation-reduction composition. After exposure, the sheets are separated by pulling them apart. The two-sheet method has been found to be quite distinctive in that a transparency or negative can be formed immediately upon development by heating or wetting. For example, the image-forming composition which is usually transparent may be coated upon a transparent backing or carrier, such as Mylar. The second sheet is coated with a pressure-sensitive adhesive or gelatin which contains a light-sensitive metal salt in admixture therewith or which contains the metal salt dusted on the surface. The sheets are pressed together and the combined sheets are then exposed to an image, such as through a developed negative or transparency. After light exposure, the sheets are separated and a transparency is produced upon the Mylar film containing the image-forming composition when heated to about 100° C. or by water wetting. As a modification of the above, the image-forming compound, such as the oxidizing agent, is coated on the first sheet with a transparent binder. The second sheet is coated with an adhesive containing both the light-sensitive metal salt and the other component of the image-forming composition, such as the reducing agent. Various other combinations as will become apparent from the above are within the scope of this invention. The above methods of forming transparencies are simple and cheap and are particularly adapted to use by the amateur photographer.

The system of the present invention may be particularly adaptable to amateur photography. In accordance with the present invention, a composition of this invention is placed upon a Mylar film in roll form and directly placed in the camera. A latent image is formed immediately upon exposure and the only remaining step in order to obtain a negative is the non-chemical development of the image. This may be done by the amateur photographer by removing the exposed negative in the dark and washing with water as above described in the dark. Other modifications or alterations are obvious for adaptation to conventional cameras.

The following examples illustrate the preparation and use of the photosensitive copy sheets of this invention and are offered as a better understanding of the present invention and are not to be construed as unnecessarily limiting thereto. In all examples, the radiation-sensitive metal salts as well as the copy sheets were prepared and maintained in the dark until exposed to the negative.

Example I

A photosensitive dispersion was prepared and coated on a 3 mil thick Mylar film. The dispersion was prepared by individually ballmilling for about 12 hours the following mixtures and then mixing the indicated amounts of the separate mixtures to form the final photosensitive dispersion: (1) .01 gram of 0.5 weight percent of silver benzenesulfinate dispersed in acetone containing 10 percent of dissolved polyvinylchloride; (2) 5.0 grams of 5 percent of silver saccharin dispersed in acetone containing 10 percent of dissolved polyvinylchloride; (3) 5.0 grams of 5 percent of Elon dispersed in acetone containing 10 percent of dissolved polyvinyl chloride. The Elon dispersion should be adjusted, if necessary, to about a neutral pH by the addition of sodium carbonate. The polyvinyl chhloride was the binder for the components upon the Mylar surface. After mixing, the above dispersion was immediately coated 3 mils thick (wet) uniformly over the entire surface of the Mylar film. After drying the prepared film was exposed through a negative in contact with the film for about 15 seconds to a commercial sun lamp set at six inches from the surface of the film. Thereafter, the exposed film was heated to 110° C. for 10 seconds after which a permanent visible image corresponding to the negative appeared.

The same procedure was followed as above after which the exposed film was developed by warm water washing. A permanent image was produced corresponding to that of the negative.

Repeating the first of the above procedures exactly except omitting the silver benzenesulfinate produced no visible image.

The silver saccharin was prepared by dissolving 21 grams of saccharin in three liters of hot xylene. To this solution was added 600 milliliters of water containing 20 grams of dissolved silver nitrate with vigorous stirring. The silver saccharin precipitates at the interface between the two solutions and is recovered by filtration and then water washed and dried.

Example II (1) Silver saccharin (5.0 grams) was dispersed in 20 grams of methylcyclohexane containing 2.0 grams of dissolved polyisobutylene. (2) 5.0 grams of 1-phenyl-3-pyrazolidone was dispersed in 20 grams of methylcyclohexane containing 2.0 grams dissolved polyisobutylene. (3) 0.005 grams of silver chloride was dispersed in 10 grams of methylcyclohexane containing 1.0 gram of dissolved polyisobutylene. Each of the dispersions were ballmilled for about 4 hours. The above dispersions (1), (2) and (3) were mixed and immediately coated uniformly 3 mils thick (wet) on plain wood pulp paper and air dried. The prepared paper was then exposed through a negative to a 600 watt ultraviolet lamp at 6 inches' distance for 10 seconds. Thereafter, the image was developed by heating the exposed paper to 90° C. for 10 seconds. The image was permanent and sharp. Development was also obtained of a similar exposed paper by warm water washing to produce a permanent image.

Hydroquinone can be used to replace the 1-phenyl-3-pyrazolidone and/or silver nitrate to replace silver chloride in the above system with similar results.

A control using the identical first procedure above in all respects but omitting the light-sensitive silver chloride formed no visible image upon development after expose for 10 seconds but a very light image could be produced if exposed for 30 seconds.

Example III

The silver saccharin dispersion (2) and the silver benzenesulfinate dispersion (1) of Example I were mixed and coated on a plain paper sheet. Thereafter, a pressure-sensitive tape containing 1-phenyl-3-pyrazolidone in the adhesive portion was pressed to the surface of the paper sheet making a laminate. The resulting laminate was exposed through a negative by a 600 watt ultraviolet lamp for 12 seconds and thereafter a visible image was developed at 110° C. for 3 seconds. Upon stripping apart the tape and paper, a brown image was retained on both. The darker image was on the paper and this sheet was stable and fixed as a result of the removal of the reducing agent contained with the adhesive.

Example IV

Phenyldiazosulfonate salts of $Cr^{+++}$, $Co^{++}$ and $Cu^{+}$ were prepared by reacting the phenyldiazosulfonic acid with the above metals. Silver saccharin and Elon dispersions were prepared using heptane as a diluent and using 10 percent polyisobutylene as a binder. 5.0 grams of each silver saccharin and Elon were used in preparing these dispersions. The dispersions were mixed and 2 percent of each of the above phenyldiazosulfonate compound was added to separate batches of the above dispersion. The separate compositions were coated uniformly over one surface of paper and dried. Exposure through a negative to a 600 watt ultraviolet lamp at 6 inches for 15–18 seconds produced a blue image on a light yellow sheet. Further development at 110° C. intensified the image to a blue black. Any excess diazo was destroyed by exposure to normal room light. This print is not as good as those prepared in the other preceding examples because of the colored background; however, the reproduction was visible and satisfactory.

Example V

A photosensitive sheet was prepared by uniformly coating over the one entire surface of a paper sheet the following mixtures: (1) 5 grams of hydroquinone and 15 grams of polyvinylchloride were ballmilled with 85 grams of acetone until both dissolved in the acetone. (2) 5 grams of silver behenate (half soap), 100 milligrams of silver chloride and 15 grams of polyvinylchloride were ballmilled with 85 grams of acetone for about twelve hours to produce a dispersion of silver behenate and silver chloride in the acetone and to dissolve the polyvinylchloride in the acetone. The first dispersion (1) above was then mixed and coated on a conventional wood pulp paper sheet to a thickness of about three mils wet and air dried. As a top coat the second dispersion (2) was similarly coated over the above coating on the paper sheet to a thickness of about three mils wet and air dried.

The coated surface of the above sheet was exposed through a transparency in a Model 48 Thermofax brand dry-copying machine for five seconds. The exposed sheet was then developed by heating to 85° C. for five seconds. A permanent reproduction of the image of the transparency was produced in good contrast.

The identical procedure above was repeated but omitting the silver chloride from the second dispersion (2). This control took twenty seconds of exposure and five seconds of development at 85° C. to give comparable image contrast.

The silver behenate (half soap) was prepared by first reacting half the mole equivalent of sodium hydroxide with behenic acid in an aqueous alcoholic solution. Then the sodium behenate (half soap) is reacted with half the mole equivalent of silver nitrate in aqueous solution under non-alkaline conditions to produce silver behenate (half soap). The silver behenate precipitate was recovered by filtration, then water washed and dried.

Example VI

A sheet similar to Example V was prepared in all respects by the identical procedure and compositions, including development and exposure, except the second dispersion (2) was prepared by ballmilling 5 grams of silver behenate (half soap), 50 milligrams of silver nitrate, 17 milligrams of potassium iodide, and 15 grams of polyvinylchloride with 85 grams of methanol until the silver behenate was dispersed and the polyvinylchloride was dissolved. The silver nitrate and potassium iodide reacted to form silver iodide in situ which silver iodide was also dispersed in the methanol. A repreduction of an image was produced as in Example V having good contrast.

Prolonged exposure of the samples does not materially improve the density of the reproduced image after a certain saturation point. After this exposure saturation point (about 2 minutes) has been reached the image density of the test sample and the control are about the same.

Various modification and alterations of the invention and its application and use will become apparent to those skilled in the art without departing from the teachings herein.

Having described our invention, we claim:

1. An image reproduction sheet which comprises a radiation-sensitive heavy metal salt which can be reduced to free metal by a radiation wave length between an X-ray wave length and a five microns wave length and being distributed substantially uniformly laterally over said sheet, and as the image forming component an oxidation-reduction reaction combination which is substantially latent under ambient conditions and which can be initiated into reaction by said free metal to produce a visible change in color comprising an organic silver salt containing carbon atoms and different from said heavy metal salt as an oxidizing agent and in addition an organic reducing agent containing carbon atoms, said radiation-sensitive heavy metal salt being present in an amount between about 50 and about 1000 parts per million of said oxidation-reduction reaction combination.

2. The image reproduction sheet of claim 1 in which said radiation-sensitive metal salt is a copper salt.

3. The image reproduction sheet of claim 1 in which said radiation-sensitive metal salt is a silver salt.

4. The image reproduction sheet of claim 1 in which said radiation-sensitive metal salt is a gold salt.

5. The image reproduction sheet of claim 1 in which said organic silver salt oxidizing agent is a silver saccharin.

6. The image reproduction sheet of claim 1 in which said organic reducing agent is 1-phenyl-3-pyrazxolidone.

7. The image reproduction sheet of claim 1 in which the organic reducing agent is N-methyl paraminophenol sulfate.

8. The image reproduction sheet of claim 1 in which said organic reducing agent is hydroquinone.

9. The image reproduction sheet of claim 1 in which the radiation-sensitive metal salt is silver chloride, the reducing agent is an aminophenol and the oxidizing agent is silver saccharin.

10. The image reproduction sheet of claim 1 in which the radiation-sensitive metal salt is silver benzene-sulfinate, the reducing agent is an aminophenol and the oxidizing agent is silver saccharin.

11. The image reproduction sheet of claim 1 in which the radiation-sensitive metal salt is silver nitrate, the reducing agent is hydroquinone and the oxidizing agent is silver saccharin.

12. The image reproduction sheet of claim 1 in which the radiation-sensitive metal salt is a diazosulfonate salt of a heavy metal, the reducing agent is 1-phenyl-3-pyrazolidone and the oxidizing agent is silver saccharin.

13. A dry image reproduction sheet which comprises a flexible carrier sheet upon which has been bonded a radiation-sensitive heavy metal salt which can be reduced to free metal by a radiation wave length between an X-ray wave length and a one micron wave length and being distributed substantially uniformly laterally over said carrier sheet, and as the image-forming component an oxidation-reduction reaction combination which is substantially latent under ambient conditions and which can be initiated into reaction by said free metal to produce a visible change in color comprising an organic silver salt containing carbon atoms and different from said heavy metal salt as an oxidizing agent and in addition an organic reducing agent containing carbon atoms, said radiation-sensitive heavy metal salt being present in an amount between about 50 and about 1000 parts per million of said oxidation-reduction reaction combination.

14. The image reproduction sheet of claim 13 in which said carrier sheet is paper.

15. The image reproduction sheet of claim 13 in which said carrier sheet is a plastic self-supporting film.

16. A method for making a permanent flexible reproduction of a light image on a carrier sheet which comprises exposing to an actinic light image as flexible reproduction sheet comprising a flexible carrier sheet upon which has been bonded a radiation-sensitive heavy metal salt which can be reduced to free metal by a radiation wave length between an X-ray wave length and a one micron wave length and being distributed substantially uniformly laterally over said carrier sheet and as the image-forming component a separate oxidation-reduction reaction combination which is substantially latent under ambient conditions and which can be initiated into reaction by said free metal to produce a visible change in color comprising an organic silver salt containing carbon atoms and different from said heavy metal salt as an oxidizing agent and in addition an organic reducing agent containing carbon atoms, said radiation-sensitive heavy metal salt being present in an amount between about 50 and about 1000 parts per million of said oxidiation-reduction reaction combination and subsequently developing said oxidation-reduction combination on said carrier sheet by heating at a temperature above 65° C. to produce an image.

17. A method for making a permanent flexible reproduction of a light image on a carrier sheet which comprises exposing to an actinic light image a flexible reproduction sheet comprising a flexible carrier sheet upon which has been bonded a radiation-sensitive heavy metal salt which can be reduced to free metal by a radiation wave length between an X-ray wave length and a one micron wave length and being distributed substantially uniformly laterally over said carrier sheet and as the image-forming component a separate oxidation-reduction reaction combination which is substantially latent under ambient conditions and which can be initiated into reaction by said free metal to produce a visible change in color comprising an organic silver salt containing carbon atoms and different from said heavy metal salt as an oxidizing agent and in addition an organic reducing agent containing carbon atoms, said radiation-sensitive heavy metal salt being present in an amount between about 50 and about 1000 parts per million of said oxidation-reduction reaction combination and subsequently developing said oxidation-reduction combination on said carrier sheet by water washing said combination on said carrier sheet.

18. A method for making a permanent flexible reproduction of a light image which comprises exposing to said light image a flexible carrier sheet containing a composition comprising a light sensitive silver salt, and as the image-forming component silver saccharin and an organic reducing agent for said silver saccharin, and subsequently developing said composition of said carrier sheet to produce an image or pattern, said light sensitive silver salt being present in an amount between about 50 and about 1000 parts per million based upon a combined total of said silver saccharin and said organic reducing agent.

*19. An image reproduction sheet capable of being used merely by exposure to a radiation-image or pattern followed by over-all moderate heating to provide the developed image, which comprises a radiation-sensitive heavy metal salt which can be reduced to free metal by a radiation wave length between an X-ray wave length and a five microns wave length and being distributed substantially uniformly laterally over said sheet, and, as the image-forming component, an oxidation-reduction reaction combination which is substantially latent under normal ambient conditions and which can be initiated into reaction at moderately elevated temperatures of the order 65° to 110° C. by said free metal to produce a visible change in color, said oxidation-reduction reaction combination comprising (1) as an oxidizing agent, an organic silver salt containing carbon atoms and being different from said heavy metal salt, and in addition (2) an organic reducing agent containing carbon atoms, said radiation-sensitive heavy metal salt being present in an amount sufficient to form a latent image but insufficient to form a visible image upon brief exposure to radiation within the aforesaid range, said amount being small in weight relative to that of said oxidation-reduction reaction combination, so that, in use, the desired visible image is formed substantially completely from the reaction of said oxidation-reduction reaction combination.*

*20. An image reproduction sheet capable of forming a permanent visible reproduction of a light-pattern or radiation pattern by brief exposure thereto followed by uniform moderate heating of said sheet, which sheet comprises, distributed substantially uniformly laterally over said sheet, (a) as a latent image-forming component and in amount sufficient only to form an invisible latent image under said exposure, a radiation-sensitive heavy metal salt which can be reduced to free metal by exposure to radiation having a wave length between an X-ray wave length and a five microns wave length, and (b) as the visible image-forming component, an oxidation-reduction reaction combination which is substantially latent under normal ambient conditions, and which can be initiated into reaction at moderately elevated temperatures of the order of 65° to 110° C. by said free metal to produce a visible change in color within a brief period not in excess of about 20 seconds, said combination comprising (1) as an oxidizing agent, an organic silver salt containing carbon atoms and being substantially non-radiation-sensitive as compared with the aforesaid radiation-sensitive heavy metal salt, and in addition (2) an organic reducing agent containing carbon atoms.*

*21. A light sensitive flexible sheet capable of forming a visible reproduction of a light image or pattern solely by exposure thereto followed by uniform heating of said sheet which sheet comprises, distributed substantially uniformly laterally over said sheet, (a) as a latent image-forming component, a light sensitive silver halide which can be reduced to free metal by light, and (b) as the visible image-forming component, an oxidation-reduction reaction combination which is substantially latent under normal ambient conditions and which can be catalytically initiated into reaction at a temperature above 65° C. by said free metal to produce a visible change in color, said oxidation-reduction reaction combination comprising an organic sliver salt oxidizing agent containing carbon atoms and being relatively non-light sensitive and in addition an organic reducing agent containing carbon atoms, said light sensitive silver halide being present in an amount by weight less than said oxidizing agent of the oxidation-reduction reaction combination and in an amount sufficient to form a latent image on exposure to light and said oxidation-reduction reaction combination being present in an amount such that the visible reproduction of the image on the sheet is obtained substantially solely by the reaction of such combination.*

*22. A method for making a visible reproduction of a light image or pattern which comprises exposing to an actinic radiation image an image reproduction sheet which comprises a radiation-sensitive heavy metal salt which can be reduced to free metal by a radiation wave length between an X-ray wave length and a five microns wave length and being distributed substantially uniformly laterally over said sheet, and, as the image-forming component, an oxidation-reduction reaction combination which is substantially latent under normal ambient conditions and which can be initiated into reaction at moderately elevated temperatures by said free metal to produce a visible change in color, said oxidation-reduction reaction combination comprising (1) as an oxidizing agent, an organic silver salt containing carbon atoms and being different from said heavy metal salt, and in addition (2) an organic reducing agent containing carbon atoms, said radiation-sensitive heavy metal salt being present in an amount sufficient to form a latent image but insufficient to form a visible image upon said exposure, said amount being small in weight relative to that of said oxidation-reduction reaction combination, so that upon said exposure, the desired visible image is formed substantially completely from the reaction of said oxidation-reduction reaction combination, to produce thereon an invisible latent image and subsequently heating said sheet at a temperature above 65° C. to develop a visible image corresponding to said latent image.*

References Cited

The following references, cited by the Examiner, are of record in the patented file of this patent or the original patent.

UNITED STATES PATENTS 3,052,541 9/1962 Brine ---------- 96—27

NORMAN G. TORCHIN, Primary Examiner

JACK P. BRAMMER, Assistant Examiner

PO-1050
(5/69)

UNITED STATES PATENT OFFICE
CERTIFICATE OF CORRECTION

Patent No. Re. 26,719 Dated November 18, 1969

Inventor(s) DAVID P. SORENSEN and JOSEPH W. SHEPARD

It is certified that error appears in the above-identified patent and that said Letters Patent are hereby corrected as shown below:

Column 1, line 2 in the title: "Print-Out Process and Image Reproduction Sheet Therefor" should read -- Image Reproduction Process and Reproduction Sheet Therefor --

Column 10, line 42: "as" should read -- a --

SIGNED AND
SEALED
JUN 30 1970

(SEAL)
Attest:

Edward M. Fletcher, Jr.
Attesting Officer

WILLIAM E. SCHUYLER, JR.
Commissioner of Patents